United States Patent Office 2,921,958
Patented Jan. 19, 1960

2,921,958

4.5.6.7.10.10 - HEXACHLORO - 4.7 - METHYLENE-4.7.8.9-TETRAHYDROINDANE-SULFONIC ACID, SALTS AND ACID AMIDES THEREOF

Hans Feichtinger, Duisburg-Beeck, Germany, assignor to Ruhrchemie Aktiengesellschaft, Oberhausen-Holten, Germany, a corporation of Germany No Drawing. Application August 31, 1955
Serial No. 531,819

Claims priority, application Germany September 3, 1954

14 Claims. (Cl. 260—501)

This invention relates to and has as its object, the production of novel 4.5.6.7.10.10-hexachloro-4.7-methylene-4.7.8.8.9-tetrahydroindane-sulfonic acid and salts and acid amides thereof which have been found to constitute excellent fungicides and intermediates for various organic syntheses.

In accordance with the invention, 4.5.6.7.10.10-hexachloro-4.7-methylene-4.7.8.9-tetrahydroindane which can relatively easily be prepared by the process of R. Riemschneider and A. Kühnl (see Mitteilungen, Physiologishches chemisches Institut, Berlin, R11, October 1947; and R. Riemschneider, Monatschefte für Chemie, vol. 83 (1952) page 807) from hexachloro-cyclopentadiene and cyclopentene by means of a Diels-Alder reaction, is converted into corresponding sulfochloride by reaction with sulfur dioxide and chlorine in the presence of an inert solvent and under the influence of a catalyst capable of free radical formation as, for example, actinic light. In accordance with the reaction, the sulfo-chloride group enters the non-substituted alicyclic portion of the molecule. The position of the sulfur-containing group at the five-membered ring remains undetermined. The reaction proceeds in accordance with the following equation:

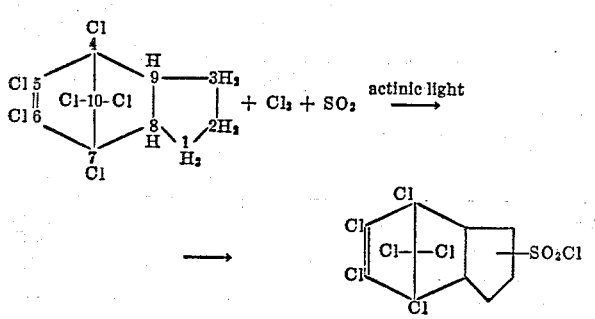

The 4.5.6.7.10.10 - hexacloro - 4.7 - methylene-4.7.8.9-tetra-hydroindane used as the starting material is dissolved in a chloro-hydrocarbon such as in carbon tetrachloride and treated with a gas mixture containing chlorine and sulfur dioxide in a ratio by volume of 1:1 to 1:3 and preferably of 1:1.25 to 1:1.50. It is most advantageous to operate at a temperature between 10 and 80° C. Optimum yields are generally obtained at 20 to 40° C. Although the concentration of the starting compound in the solvent used is unimportant, too high a concentration is disadvantageous for the conversion with the gas mixture.

The reaction may be catalyzed with actinic light as, for example, with a bulb radiating ultraviolet light. However, other catalysts are also suitable for initiating this radical chain reaction, as, for example, substances such as peroxides or azo compounds which promote the formation of free radicals.

After the reaction, the 4.5.6.7.10.10-hexachloro-4.7-methylene - 4.7.8.9-tetrahydroindane - sulfochloride-(x) formed can easily be separated from the reaction mixture. For this purpose, the solvent used is at first driven off. This is followed by precipitation with suitable solvents such as lower aliphatic hydrocarbons. Thereby, the sulfochloride is obtained in crystallized form. After recrystallization, the new compound has a melting point of 147° C. and is completely uniform in its other chemical and physical characteristics.

By saponification with water in a closed system, quantitative conversion into the corresponding sulfonic acid is achieved at a temperature above 150° C. The characteristics of this sulfonic acid can be illustrated by the formation of a benzyl thiuronium salt having a melting point of 200° C. The reactions involved correspond to the following scheme:

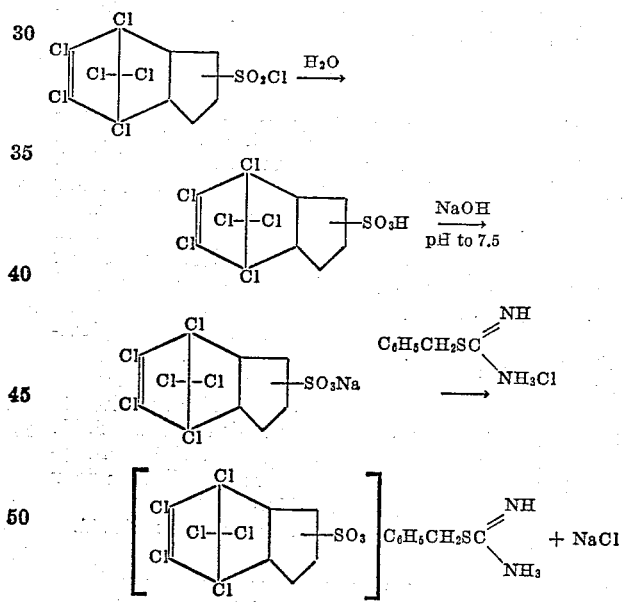

Further derivatives of this sulfonic acid are obtained by reacting the sulfochloride with a number of compounds which have a mobile hydrogen atom. With ammonia, morpholine, (cyclopentyl-methyl)-amine, and other primary and secondary amines, a number of N-substituted 4.5.6.7.10.10 - hexachloro - 4.7 - methylene-4.7.8.9-tetrahydroindane-sulfonic acid amide-(x) derivatives can be obtained. The corresponding sulfonamides are in this case obtained in very good yields.

The formation of these new N-derivatives of 4.5.6.7.10.10 - hexachloro - 4.7 - methylene - 4.7.8.9 - tetrahydroindane-sulfonic-(x) acid may be exemplified by the following reaction scheme:

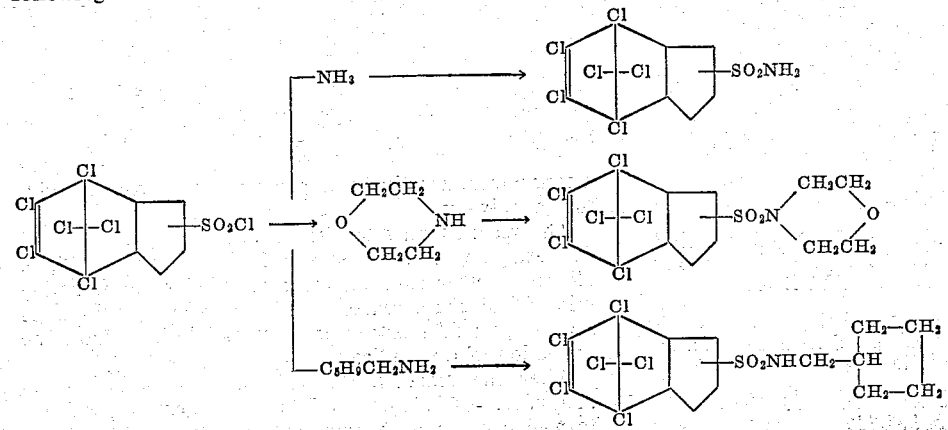

Of these new compounds metal-salts and salts with inorganic or organic bases of 4.5.6.7.10.10-hexachloro-4.7 - methylene - 4.7.8.9 - tetrahydroindane - sulfonic-acid-(x) have excellent fungistatic and fungicide properties. Their effect depends on the concentration used.

The metal-salts are produced in the usual manner from the sulfonic-acid by conversion with the correspondent metal-carbonates, metal-hydroxides or metal-oxides, while other salts can be produced by simple neutralisation of sulfonic acids according to the invention with an inorganic or organic base in water or alcoholic solution. This kind of salts is tested against rhizoctonia solani, rhizoctonia solani f. dianthi and alternaria tenuis. In this way—with water solutions or suspensions employed, containing 0.001–0.1% effective material—an extinction or at least a considerable restriction in growth of the fungi mentioned could already be found.

The following examples are given by way of illustration and not limitation:

Example 1

170 grams (0.5 mole) of 4.5.6.7.10.10-hexachloro-4.7-methylene-4.7.8.9-tetrahydroindane were dissolved in 500 cc. of carbon tetrachloride and treated at 20° C. with 8 liters/hr. of chlorine and 10 liters/hr. of sulfur dioxide while irradiating with a 500 w. mercury vapor lamp. After 4 hours, the treatment was discontinued and the sulfochlorination product freed from the solvent under vacuum. The oily residue remaining in a yield of 210 grams was treated with 500 cc. of petroleum ether. Thereby, the 4.5.6.7.10.10 - hexachloro - 4.7 - methylene-4.7.8.9-tetrahydroindane-sulfochloride-(x) separated as a white crystal powder. After filtration, 49 grams of sulfochloride were obtained, which corresponded to 22.4% of the theoretically possible yield. The 4.5.6.7.10.10 - hexachloro - 4.7 - methylene - 4.7.8.9 - tetrahydroindane-sulfochlorodie-(x), after recrystallization from benzene, had a melting point of 151° C.

Formula: $C_{10}H_7O_2SCl_7$. Molecular weight: 439.42.

|   | Calculated, percent | Found, percent |
| --- | --- | --- |
| C | 27.34 | 27.50 |
| H | 1.61 | 1.76 |
| O | 7.28 | 7.28 |
| S | 7.30 | 7.09 |
| Cl | 56.47 | 56.68 |

Example 2

170 grams (0.5 mole) of 4.5.6.7.10.10-hexachloro-4.7-methylene-4.7.8.9-tetrahydroindane were treated for 10 hours at 20° C. with 8 liters/hr. of chlorine and 10 liters/hr. of sulfur dioxide in the manner set forth in Example 1. After processing, there were obtained 19 grams of 4.5.6.7.10.10-hexachloro-4.7-methylene-4.7.8.9-tetrahydroindane-sulfochloride-(x) which corresponded to 8.7% of the theoretically possible yield.

Example 3

170 grams (0.5 mole) of 4.5.6.7.10.10-hexachloro-4.7-methylene-4.7.8.9-tetrahydroindane, in the manner set forth in Example 1, were reacted for 2 hours at 40° C. with 8 liters/hr. of chlorine and 10 liters/hr. of sulfur dioxide. After processing, there were obtained 20 grams of 4.5.6.7.10.10-hexachloro-4.7-methylene-4.7.8.9-tetrahydroindane-sulfochloride-(x), which corresponded to 9.1% of the theoretically possible yield.

Example 4

4.39 gms. (0.01 mole) of 4.5.6.7.10.10-hexachloro-4.7 - methylene - 4.7.8.9 - tetrahydroindane - sulfochloride-(x) were heated with 18 grams (1 mole) of water for 10 hours at 160° C. in a closed tube. Thereafter, the contents of the tube was evaporated to dryness under vacuum. As the finished product, there were obtained 4.1 grams of 4.5.6.7.10.10-hexachloro-4.7-methylene-4.7.8.9-tetrahydroindane-sulfonic-(x) acid. This corresponded to 98% of the theoretically possible yield.

From this sulfonic acid, 2.1 grams (0.005 mole) were dissolved in 50 cc. of water, neutralized with 0.5 N sodium hydroxide solution to pH 7.5, and mixed with a solution of 0.85 gm. (0.005 mole) of S-benzyl-thiuronium chloride in 10 cc. of water. The precipitating deposit of the S-benzyl-thiuronium salt of the 4.5.6.7.10.10-hexachloro - 4.7 - methylene - 4.7.8.9 - tetrahydroindane-sulfonic-(x) acid was filtered off after 5 hours and dried. This compound had a melting point of 200° C.

Formula: $C_{18}H_{18}O_3N_2S_2Cl_6$. Molecular weight: 587.21.

|   | Calculated, percent | Found, percent |
| --- | --- | --- |
| C | 36.82 | 36.63 |
| H | 3.09 | 3.27 |
| N | 4.77 | 4.48 |
| Cl | 36.21 | 35.90 |

Example 5

4.39 grams (0.01 mole) of 4.5.6.7.10.10-hexachloro-4.7 - methylene - 4.7.8.9 - tetrahydroindane - sulfochloride-(x) were slowly introduced into 8.5 grams (0.5 mole) of liquefied ammonia. After 1 hour, the reaction mixture was treated with water and the residue was filtered off. The finished product obtained consisted of 4 grams of 4.5.6.7.10.10 - hexachloro - 4.7 - methylene-4.7.8.9-tetrahydroindane-sulfonamide-(x). This corresponded to 95% of the theoretically possible yield.

After recrystallization from benzene, the compound had a melting point of 185° C.

Formula: $C_{10}H_9O_2NSCl_6$. Molecular weight: 419.97.

|   | Calculated, percent | Found, percent |
|---|---|---|
| C | 28.60 | 28.52 |
| H | 2.16 | 2.22 |
| O | 7.62 | 7.57 |
| N | 3.34 | 3.30 |
| S | 7.64 | 7.71 |
| Cl | 50.64 | 50.42 |

*Example 6*

4.39 grams (0.01 mole) of 4.5.6.7.10.10-hexachloro-4.7 - methylene - 4.7.8.9 - tetrahydroindane - sulfochloride-(x) were heated for 2 hours with 8.71 grams (0.1 mole) of morpholine with the use of a reflux condenser. The reaction mixture was treated with 2 N hydrochloric acid and the residue was filtered off. The yield amounted to 86% of the theoretically possible amount and comprised 4.2 grams of morpholide of 4.5.6.7.10.10-hexachloro - 4.7 - methylene - 4.7.8.9 - tetrahydroindane-sulfonic-(x) acid. When recrystallized from a gasoline-alcohol mixture, the compound had a melting point of 157° C.

Formula: $C_{14}H_{15}O_3NSCl_6$. Molecular weight: 490.06.

|   | Calculated, percent | Found, percent |
|---|---|---|
| C | 34.30 | 34.17 |
| H | 3.08 | 3.11 |
| O | 9.79 | 9.69 |
| N | 2.86 | 2.81 |
| S | 6.58 | 6.58 |
| Cl | 43.39 | 43.19 |

*Example 7*

4.39 grams (0.01 moles) of 4.5.6.7.10.10-hexachloro-4.7 - methylene - 4.7.8.9-tetrahydroindane-sulfochloride-(x) were heated for 2 hours with 9.92 grams (0.1 moles) of 1¹-amino-1-methyl-cyclopentane ([cyclopentylmethyl]-amine) with the use of a reflux condenser. The reaction product was treated with 2 N hydrochloric acid and the residue was filtered off. This resulted in 4.0 grams of [cyclopentyl-methyl]-amide of 4.5.6.7.10.10-hexachloro-4.7 - methylene - 4.7.8.9-tetrahydroindane-sulfonic-(x) acid, which corresponded to a yield of 80% of the theoretically possible amount. When recrystallized from a gasoline-alcohol mixture, the compound had a melting point of 154° C.

Formula: $C_{16}H_{19}O_2NSCl_6$. Molecular weight: 502.11.

|   | Calculated, percent | Found, percent |
|---|---|---|
| C | 38.27 | 38.24 |
| H | 3.81 | 3.78 |
| O | 6.37 | 6.56 |
| N | 2.79 | 2.86 |
| S | 6.39 | 6.64 |
| Cl | 42.36 | 42.59 |

I claim:
1. 4.5.6.7.10.10 - hexachloro - 4.7-methylene-4.7.8.9-tetrahydroindane-sulfochloride having a melting point of about 151° C.
2. 4.5.6.7.10.10 - hexachloro - 4.7 - methylene - 4.7.8.9-tetrahydroindane-sulfonic-acid being the hydrolysis product of the compound of claim 1.
3. The S-benzylthiuronium salt of 4,5,6,7,10,10-hexachloro - 4,7-methylene-4,7,8,9-tetrahydroindane sulfonic acid having a melting point of about 200° C.
4. Process for the production of 4.5.6.7.10.10-hexachloro - 4.7 - methylene-4.7.8.9-tetrahydroindane-sulfochloride which comprises contacting 4.5.6.7.10.10-hexachloro-4.7-methylene-4.7.8.9-tetrahydroindane with sulfur dioxide and chlorine in the presence of a catalyst capable of promoting free radical formation and recovering the 4.5.6.7.10.10 - hexachloro - 4.7-methylene-4.7.8.9-tetrahydroindane-sulfochloride formed.
5. Process according to claim 4 in which said catalyst is actinic light.
6. Process according to claim 4 in which the recovered 4.5.6.7.10.10 - hexachloro - 4.7-methylene-4.7.8.9-tetrahydroindane-sulfochloride is saponified by contacting with water while heating under pressure and in which the 4.5.6.7.10.10 - hexachloro - 4.7-methylene-4.7.8.9-tetrahydroindane-sulfonic acid formed is recovered.
7. Process according to claim 6 in which said heating is effected to a temperature between about 150 to 200° C.
8. Process according to claim 6, in which the recovered 4,5,6,7,10,10 - hexachloro - 4,7-methylene-4,7,8,9-tetrahydroindane sulfonic acid is neutralized with sodium hydroxide and thereafter reacted with S-benzylthiuronium chloride, both steps being carried out in aqueous media.
9. Process according to claim 4 in which said contacting with sulfur dioxide and chlorine is effected in the presence of an inert solvent.
10. Process according to claim 9 in which said inert solvent is a chlorinated hydrocarbon.
11. Process according to claim 4 in which said contacting with sulfur dioxide and chlorine is effected with 1–3 parts by volume of sulfur dioxide gas per part by volume of chlorine gas.
12. Process according to claim 11 in which said contacting with sulfur dioxide and chloride is effected with 1.25–1.50 parts by volume of sulfur dioxide gas per part by volume of chlorine gas.
13. Process according to claim 4 in which said contacting with sulfur dioxide and chlorine is effected at a temperature between about 10 and 80° C.
14. Process according to claim 13 in which said contacting with sulfur dioxide and chlorine is effected at a temperature between about 20 and 40° C.

References Cited in the file of this patent

UNITED STATES PATENTS

| 2,174,505 | Richmond | Sept. 26, 1939 |
| 2,174,506 | Fox | Sept. 26, 1939 |
| 2,193,824 | Lockwood | Mar. 19, 1940 |